United States Patent [19]

Adrian

[11] Patent Number: 4,502,236
[45] Date of Patent: * Mar. 5, 1985

[54] CARD CARRYING MICROFILM AND ASSOCIATED READING LENS

[76] Inventor: David L. Adrian, 35 Kings Ct., Abilene, Tex. 79605

[*] Notice: The portion of the term of this patent subsequent to Jul. 19, 2000 has been disclaimed.

[21] Appl. No.: 502,602

[22] Filed: Jun. 9, 1983

Related U.S. Application Data

[63] Continuation-in-part of Ser. No. 229,972, Jan. 30, 1981.

[51] Int. Cl.³ .................................. G02B 27/04
[52] U.S. Cl. ........................ 40/365; 40/158 B
[58] Field of Search ............ 40/10 D, 158 R, 158 B, 40/159, 362, 365, 366, 625, 626; 206/45.3

[56] References Cited

U.S. PATENT DOCUMENTS

| | | | |
|---|---|---|---|
| 764,273 | 7/1904 | Denton et al. | 40/159 |
| 2,449,204 | 9/1948 | Curtis | 206/45.34 |
| 2,867,053 | 1/1959 | Boor | 206/45.34 |
| 3,117,608 | 1/1964 | Goss et al. | 40/158 B |
| 4,393,610 | 7/1983 | Adrian | 40/365 |

FOREIGN PATENT DOCUMENTS 967525  5/1975  Canada ........................ 40/10 D Primary Examiner—Robert Peshock
Assistant Examiner—Wenceslao J. Contreras
Attorney, Agent, or Firm—Arthur F. Zobal

[57] ABSTRACT

A card having an information upon which information appears that can be read in the normal manner; a portion carrying a microfilm upon which information is recorded and a portion carrying a lens suitable for reading the microfilm. The card comprises a paper card having an aperture formed in one end region in which is located the microfilm. A pair of flexible clear plastic sheets laminate opposite sides of the paper card including the microfilm. A lens aperture is formed through the clear plastic sheets and through the paper card at an end region opposite the microfilm. A round plastic lens is located in the lens aperture. The lens comprises a central magnifying portion and an outer rim having an outer annular flange. The outer rim is higher than the surface of the central magnifying portion on each side thereof for providing protection for the central magnifying portion of the lens. The lens is secured in the aperture either by ultrasonic welding or by adhesive.

8 Claims, 15 Drawing Figures

U.S. Patent Mar. 5, 1985 4,502,236
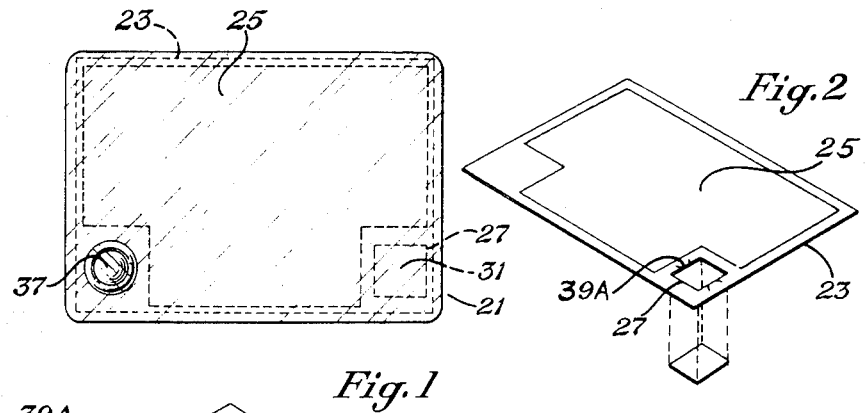
Fig. 1
Fig. 2
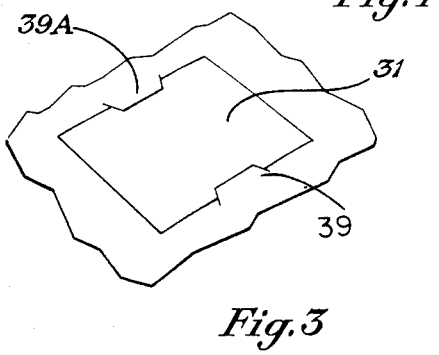
Fig. 3
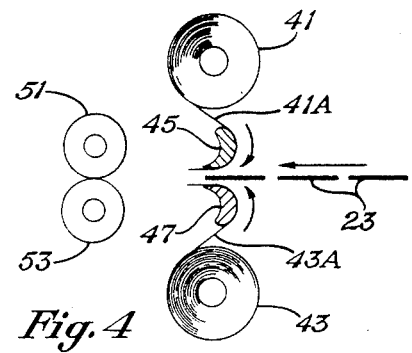
Fig. 4
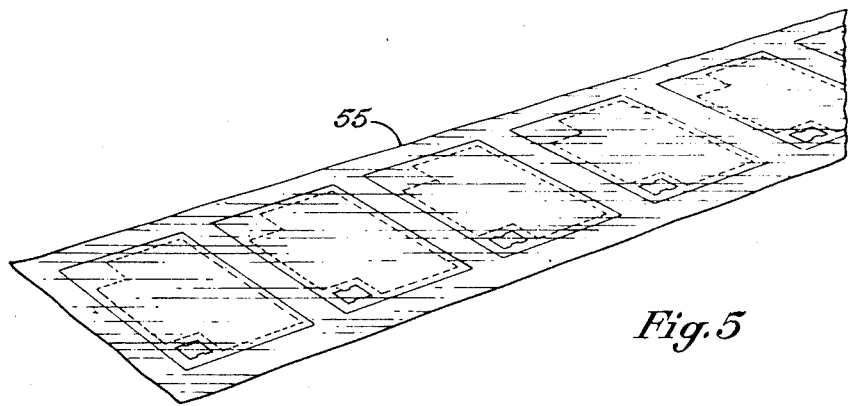
Fig. 5

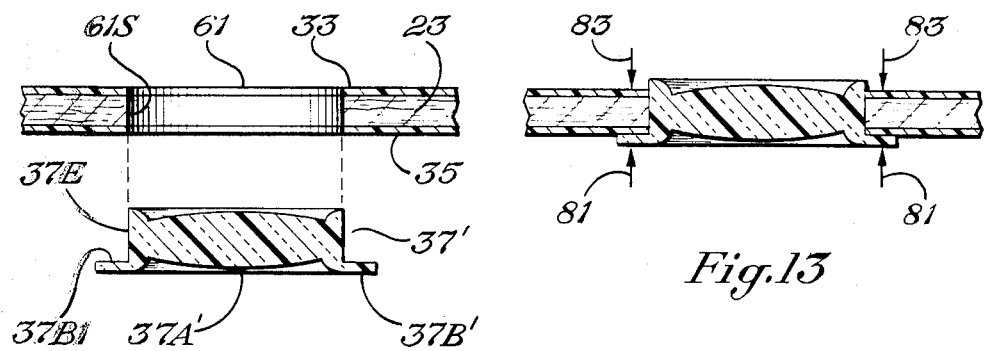
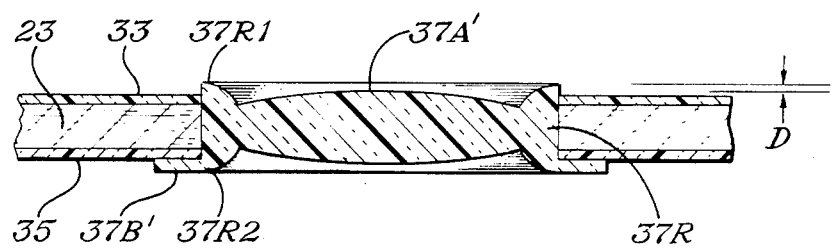
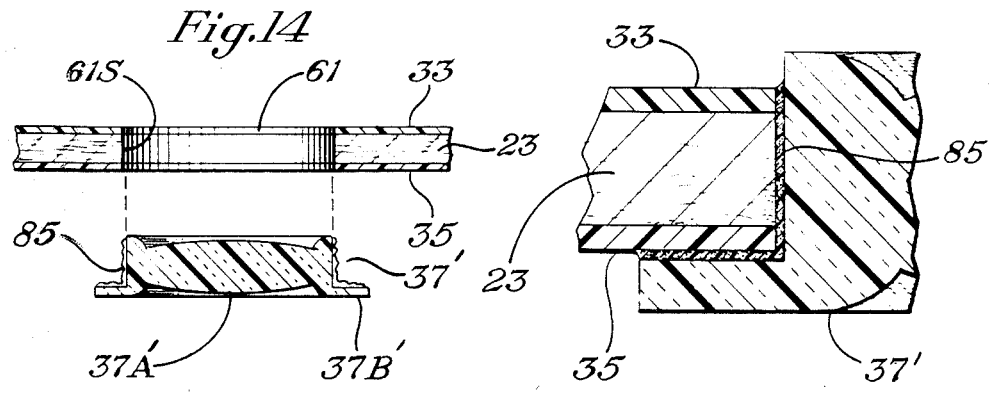

CARD CARRYING MICROFILM AND ASSOCIATED READING LENS

This application is a continuation-in-part of U.S. Pat. application Ser. No. 229,972 filed Jan. 30, 1981.

FIELD OF THE INVENTION

The present invention relates to a card having a microfilm and a lens for reading the microfilm.

BACKGROUND OF THE INVENTION

U.S. Pat. application Ser. No. 13,158 filed Feb. 21, 1979 discloses a billfold size data card carrying a microfilm and a lens for reading the microfilm. The card is formed from a laminated paper card having an information portion upon which information appears that can be read in the normal manner with the naked eye. In the embodiment of the card actually produced, the paper card has a microfilm aperture formed at one end and a lens aperture formed at an opposite end. In carrying out the laminating process in this embodiment, the lens and microfilm are loaded into the appropriate apertures of the paper card and a plurality of the paper cards are fed sequentially through a continuous laminating machine. In the machine, continuous strips of the laminating material are preheated and then simultaneously applied to opposite sides of the paper cards as they are fed through the machine at spaced apart position, thus laminating opposite sides of each paper card including its lens and microfilm. A continuous strip of spaced apart laminated paper cards is fed out of the machine with the laminating material extending beyond each side of the paper cards. This strip of laminated paper cards then is fed through a cutter that cuts out each individual card leaving a strip of laminating material on all four sides of the paper card. The laminating material that covers both sides of the viewing areas of the lens of each card is removed with cutting heads, leaving a small portion of the laminating material around the outer edge of the lens on both sides to hold the lens in place.

Although the process produces a suitable card, it has disadvantages in that occasionally one of the preheated laminating strips will sag and catch one of the lenses and twist the card. In addition, during the laminating process, the lenses frequently fall out of their apertures since they are temporarily held in place by friction for lamination.

U.S. Pat. application Ser. No. 229,972, filed Jan. 30, 1981, discloses an improved process for forming a data card of the type having a microfilm and a plastic reading lens. The lens is located in an aperture formed through the card and the magnifying portion of the lens is protected by an outer rim of the lens having outer flanges on opposite sides which grip the card to secure the lens in the aperture. The lens is formed initially with one flange extending radially outward and the other flange extending perpendicular to said one flange. The lens is inserted into the lens aperture with said one flange engaging one side of the card and the other flange extending perpendicular beyond the other side of the card. The other flange then is pressed while heated against the other side of the card for causing the two flanges to grip the opposite sides of the card for securing the lens in the lens aperture.

Although the lenses are satisfactory, occasionally, the flange that has been pressed into place will chip or break off resulting in the lens coming out of its aperture.

SUMMARY OF THE INVENTION

It is an object of the present invention to provide a process for forming a data card of the type having a microfilm and a reading lens and which process avoids the above identified problems.

It is an object of the present invention to provide a data card of the type having a microfilm and a reading lens wherein the lens is attached to the card in a novel manner.

It is an object of the present invention to provide a data card of the type having a microfilm and a reading lens wherein the lens is located in an aperture formed through the card and the magnifying portion of the lens is protected by the outer portion of the lens which is secured to the card.

The outer portion comprises an outer edge located within said aperture and an annular flange on one side of said outer edge and extending outward beyond said outer edge. The annular flange engages one side of said data card. In the embodiments disclosed, the outer portion of the lens is secured to the card by ultrasonic welding or by an adhesive.

BRIEF DESCRIPTION OF THE DRAWINGS

FIG. 1 is a top view of a data card.

FIG. 2 illustrates a rectangular aperture being punched through a paper card for receiving a microfilm.

FIG. 3 illustrates a microfilm located in the paper card of FIG. 2.

FIG. 4 illustrates the manner in which a plurality of the paper cards with their microfilms are laminated.

FIG. 5 is continuous strip of laminated paper cards.

FIG. 11 illustrates a modified lens being inserted into the aperture of the card of FIG. 6.

FIG. 12 illustrates the lens of FIG. 11 inserted and secured in the aperture of the card.

FIG. 13 illustrates the lens of FIG. 12 being secured in the aperture of the card by ultrasonic welding.

FIG. 14 illustrates the lens of FIG. 12 with adhesive on its outer portion for securing the lens in the aperture of the card.

FIG. 15 is a partial enlargement of the lens in the aperture of the card illustrating the adhesive securing or bonding the lens in place.

DESCRIPTION OF THE PREFERRED EMBODIMENTS

Figure 6:
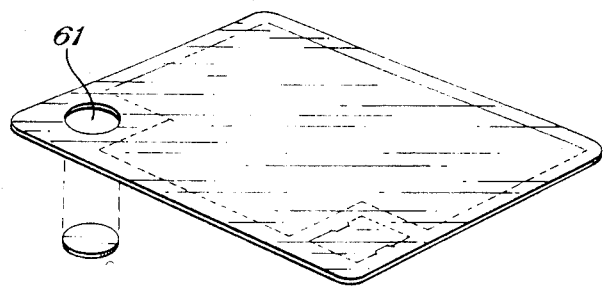
FIG. 6 is a single laminated card cut from the strip of FIG. 5 and with a round aperture being punched for receiving a magnifying lens.

Referring now to FIG. 1 of the drawings, reference numeral 21 identifies a data card. It comprises a flexible paper stock card 23 having an information portion 25 containing information which may be read in the normal manner with the naked eye. The paper stock card 23 has a rectangular shaped aperture 27 punched through one end, in which is located a microfilm 31. The paper stock card 23 and its microfilm 31 are laminated on opposite sides with clear flexible sheets of plastic material which are sealed along their peripheral edges. The two laminating plastic sheets or layers are illustrated at 33 and 35 in FIGS. 7-10. The laminated card 21 has a round aperture 61 punched therethrough at an end opposite the mocrofilm and in which is secured a magnifying reading lens 37.

In order to read the microfilm 31 it is only necessary for the reader to bend the card 21 so as to align the lens 37 with the microfilm 31 at the requisite focal distance, using a light source as a background. No special light source is needed. Ordinary room lighting illumination is satisfactory, or even normal daylight is adequate.

In one embodiment, the card 21 is an emergency medical data card of billfold size that can be conveniently carried by a person. In this embodiment, the microfilm 31 carries pertinent medical information. In the event of an emergency, the medical information is immediately available to the treating physician. On the front side of the card, the information portion 25, for example, carries the person's name, address, date of issue of the card and any complicating conditions such as whether the person is a diabetic, etc. On the back side of the card, an information portion corresponding to 25 carries instructions on how to use the card.

Referring now to FIGS. 2-10 there will be described a process in which the card 21 is formed and more details of the card. If the card is an emergency medical data card to be carried by a person, the person's name, address, date of issue of the card, any complicating conditions, etc. will be typed in the information containing portion on the front side 25 of the paper stock card 23. On the back side of the paper card 23, the instructions for using the card will be pre-printed. The rectangular aperture 27 is punched with a suitable tool. Also slits 39 are formed in the card 23 at opposite edges of the aperture 27 for forming tabs 39A for holding the microfilm 31 as shown in FIG. 3. The microfilm has clear borders on opposite sides that extend beyond the width of the aperture 27. These borders are inserted under the tabs and over the face of the card 23 to hold the microfilm in place. The slits 39 may be formed in only one edge of the aperture for holding the microfilm in place. In this embodiment, the microfilm will have a clear border on one side only which will be inserted in the slits 39 on the corresponding side of the aperture 27. In a further embodiment, the microfilm may be held in place in the aperture by applying adhesive on the clear border or borders of the microfilm for gluing the clear edge or edges of the microfilm to the card 23.

After the proper microfilm has been inserted in the rectangular aperture 27, the card 23 and the microfilm are laminated on opposite sides with clear flexible sheets of plastic material to form the laminating layers 33 and 35. Preferably laminating is carried out in a continuous laminating machine that simultaneously laminates both sides of the card. Such a machine is illustrated in FIG. 4. As shown in FIG. 4 two rolls 41 and 43 of clear plastic strips 41A and 43A of thermoplastic material are fed around heated shoes 45 and 47 and between pressure rollers 51 and 53 which are biased together by springs (not shown). The plastic strips 41A and 41B are formed of thermoplastic materials such as polyester-polyethylene and/or polyester-copolymers and like products. A plurality of the card 23 each loaded with its microfilm are sequentially fed between the heated plastic strips 41A and 43A at spaced apart positions as the strips 41A and 43A are unwound from their rolls 41 and 43 and pulled around the shoes 45 and 47 and between the rollers 51 and 53. The widths of the strips 41A and 43A are greater then the widths of the cards 23 whereby the pressure rollers cause the heated strips 41A and 43A to conform to and laminate opposite sides of the cards including their microfilms with a layer of clear plastic material with the layers being sealed and bonded together along and beyond the peripheral edges of the cards to form a strip 55 of laminated cards as shown in FIG. 5. The sides of the strips 41A and 43A which contact the cards 23 have a clear adhesive thereon for bonding the strips to opposite sides of the cards and together beyond the peripherial edges of the cards. A cutter is employed to cut out each individual card leaving about one eighth of an inch of laminating material beyond each edge of the card 23.

Referring to FIG. 6, a round aperture 61 then is punched through the card 21 (through plastic layer 33, paper stock card 23 and layer 35) at an end region opposite the microfilm 31. A plastic magnifying lens 37 then is inserted into the aperture 61 and secured to the card.

Figures 7, 8:
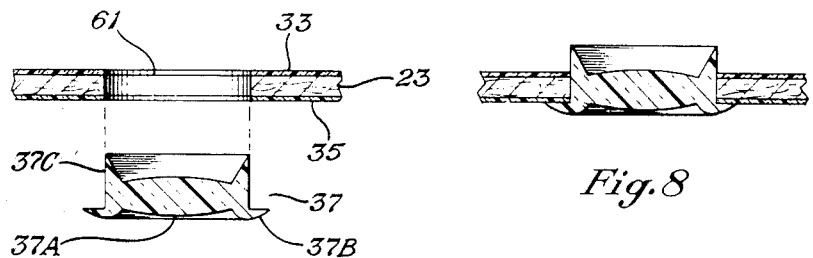
FIGS. 7-9 illustrate a partial cross-section of the card of FIG. 6 and its lens aperture with the lens being inserted into the aperture and secured to the card.
Figure 9:
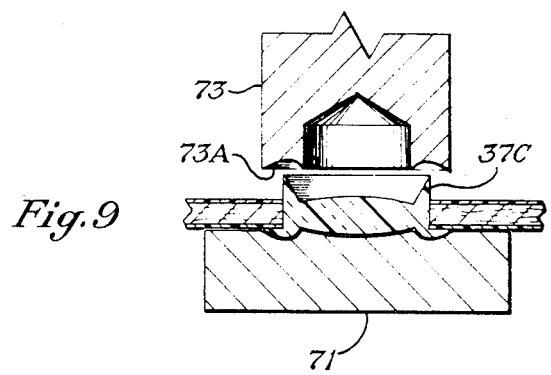
Figure 10:
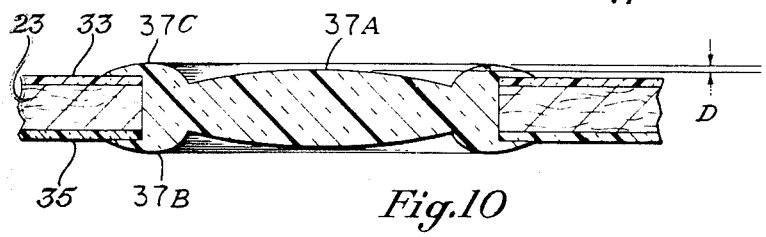
FIG. 10 is a partial cross-section of the card of FIG. 6 with the lens located in the lens aperture and secured to the card.

Referring to FIGS. 7 and 8, a cross-section of the plastic lens 37 is shown. The plastic lens 37 is of a thermoplastic material such as acrylic, styrene, or polycarbonate. It is injection molded to have the shape shown in FIGS. 7 and 8. As shown in these figures, the lens 37 comprises a round central magnifying portion 37A and two annular flanges 37B and 37C formed around the outer edge of the magnifying portion 37A. The flange 37B extends outward from the magnifying portion 37A while the flange 37C extends perpendicular to the thin plane of the lens and to the flange 37A. In securing the lens 37 to the card 21 in the aperture 61, it is inserted into the aperture from either side of the card until the flange 37B engages the side of the card and the flange 37C projects through the aperture and extends above the other side of the card as shown in FIG. 8. The card with the lens then is located on a tool 71 and a tool 73, heated to about 200° F., is pressed against the flange 37C with sufficient pressure to force the flange 37C to conform to the configuration of the heated surface 73A. This results in the flange 37C being pressed onto the top surface (as shown in FIG. 10) of the card whereby the two flanges 37B and 37C grip the opposite sides of the card next to the aperture 61 and secure the lens to the card and in the aperture 61.

The resultant product is a paper card 23 and microfilm 31 protected by plastic laminations 33 and 35 with the reading lens 37 located in the aperture 61 formed through the laminated card 31 and held in place by the two lens flanges 37C and 37B. The lens flanges 37C and 37B are molded to provide a rim that is about 0.005 of an inch above the maximum surface of the magnifying portion 37A of the lens on each side thus providing protection from excessive scratching of the viewing area of the lens. In FIG. 10, D is about equal to about 0.005 of an inch.

In one embodiment the card 21 has dimensions of about 3½ inches long and about 2 6/16 inches wide. The microfilm 31 has dimensions of about 9/16 of an inch long and about 6/16 of an inch wide. The lens 37 has a diameter of about 9/16 of an inch and a thickness of about 1/16 of an inch. It is of the double convex type having a power of about 10 with a focal length of about 1 inch.

Instead of laminating the cards 23 in a continuous laminating machine using continuous strips 41A and 43A of plastic laminating material, they may be laminated individually. In this embodiment, after loading the microfilm into the aperture 27 of the paper card 23, both the card and the microfilm are inserted between two sides of a pre-cut laminating pouch. The pouch is formed by cutting the clear plastic laminating material to the predetermined finished size and then joining the two pieces together along one edge only. This leaves an envelope or pouch that can hold the paper card and microfilm to be laminated. The pouch is designed to be approximately ⅛ of an inch larger on all four sides then the paper card 23 to be laminated. The loaded pouch then is fed into a laminating machine with heated pressure rollers that rotate and slowly carry the pouch through the machine for laminating the clear plastic sheets to opposite sides of the paper card 23 and its microfilm 31. The aperture 61 then is punched through each laminated card and the lens is secured in the aperture 61 and to the card 21 in the manner described above.

Referring to FIGS. 11-15, the lens shown is identified at 37'. It is the same as lens 37 except that it does not have the flange 37C and the outer edge of the flange 37B' is rectangular in cross section as shown in FIGS. 11-15. The magnifying portion of the lens 37' is identified at 37A'. The outer rim 37R at 37R1 and 37R2 is about 0.005 of an inch above the surface of the magnifying portion 37A' of the lens on each side to provide protection against scratches. In FIG. 12, D is equal to about 0.005 of an inch.

The lens 37' can be secured in the aperture 61 of the data card by ultrasonic welding or with the use of a suitable liquid adhesive. Referring to FIGS. 11 and 13, in the ultrasonic bonding or welding process, the lens 37' is inserted in the aperture 61 from either side of the card such that the surface 37B1 of the flange 37B' engages either of the plastic layers 33 or 35 with the rim surface 37R1 extending above the other plastic layer of the card. An annular ultrasonic welding head then is applied to the flange 37B' as shown by the arrows 81 and an annular ultrasonic welding head is applied to the plastic layer on the other side of the card as shown by the arrows 83. The ultrasonic welding heads then are operated to cause the flange 37B' to bond to the plastic layer that it is engaging.

Referring to FIGS. 14 and 15, in the adhesive bonding process, liquid adhesive 85 is applied to the surface 37B1 of the flange 37B' and to the outer edge 37E of the rim 37R. The lens 37' then is inserted in the aperture 61 from either side of the card such that the surface 37B1 of the flange 37B' engages either of the plastic layers 33 or 35 with the rim surface 37R1 extending above the other plastic layer of the card. The adhesive 85 thus will bond the flange 37B' to the plastic layer of the card which it is engaging and also will bond the edge 37E of the rim 37R to the inside surface 61S of the aperture 61.

In one embodiment, the liquid adhesive used for bonding the lens in the aperture 61 of the card may be a commercially available adhesive or glue, for example, sold under the trademark or trade name of Super Glue by Loctite Corporation of Cleveland, Ohio, or Permabond Super Glue by International Adhesives Corporation, Englewood, N.Y. Both of these glues are a cyanoacrylate type glue.

Although the interior card 23 was described as being formed of paper, it is to be understood that it could be formed of a suitable plastic material in thin sheet form that can be printed on.

In the embodiment of FIGS. 11-15, the lens 37' may be formed of plastic as mentioned above, injection molded to have the shape shown in FIGS. 11-15.

Although the card of the present invention preferably is used as an emergency medical card it may be used for other purposes. For example, it may be used for the following purposes: industrial ID and security card; industrial warranty card; proof of production standards; combination of bank ID and emergency medical card; insurance company combination emergency medical and policy coverage card; international poison index card; international travel card; etc.

I claim:

1. A data card comprising:
   a thin flexible member having an information portion upon which information appears that can be read in the normal manner with the naked eye with a portion removed at one end region,
   a microfilm upon which information is recorded and which is disposed at said one end region,
   a pair of flexible clear plastic sheets laminating opposite sides of said thin flexible member respectively, including said microfilm,
   an aperture formed through said clear plastic sheets and through said thin flexible member at an end region opposite said one end region,
   a lens located in said aperture,
   said lens having a central magnifying portion and an outer portion for securing said lens to said data card and in said aperture,
   said outer portion extending transversely to the thin plane of said lens beyond said central magnifying portion on each side of said lens for providing protection for each side of said central magnifying portion,
   said data card being flexible whereby a reader may bend said data card to align and focus the lens on the microfilm for reading the same.

2. The data card of claim 1, wherein:
   said outer portion of said lens is secured to said data card with an adhesive material.

3. The data card of claim 1, wherein:
   said lens comprises a plastic lens,
   said outer portion of said lens is secured to said data card by ultrasonic welding.

4. The data card of claim 1, wherein:
   said thin flexible member comprises a flexible paper stock.

5. The data card of claim 1, wherein:
   said lens comprises a plastic lens,
   said outer portion comprises an outer edge located within said aperture and an annular flange on one side of said outer edge and extending outward beyond said outer edge,
   said annular flange engaging one side of said data card, 6. The data card of claim 5, wherein:
   said outer edge and said annular flange are secured to said data card with an adhesive material.

7. The data card of claim 5, wherein:
   said annular flange is secured to said data card by ultrasonic welding.

8. The data card of claim 1, wherein:
   said microfilm is located in an aperture formed through said flexible member at said one end region.

* * * * *